(12) United States Patent
Taylor et al.

(10) Patent No.: US 9,758,068 B2
(45) Date of Patent: Sep. 12, 2017

(54) CHILD RESTRAINT WITH RECLINE

(71) Applicants: Andrew J. Taylor, Mohnton, PA (US); James M. F. Hutchinson, Mohnton, PA (US)

(72) Inventors: Andrew J. Taylor, Mohnton, PA (US); James M. F. Hutchinson, Mohnton, PA (US)

(73) Assignee: Wonderland Nurserygoods Company Limited, Hong Kong (HK)

( * ) Notice: Subject to any disclaimer, the term of this patent is extended or adjusted under 35 U.S.C. 154(b) by 0 days.

(21) Appl. No.: 15/188,973

(22) Filed: Jun. 21, 2016

(65) Prior Publication Data

US 2016/0368400 A1    Dec. 22, 2016

Related U.S. Application Data

(60) Provisional application No. 62/182,857, filed on Jun. 22, 2015.

(51) Int. Cl.
*B60N 2/28* (2006.01)

(52) U.S. Cl.
CPC ......... *B60N 2/2875* (2013.01); *B60N 2/2821* (2013.01); *B60N 2/2851* (2013.01)

(58) Field of Classification Search
CPC .. B60N 2/2875; B60N 2/2878; B60N 2/2821; B60N 2/2851
See application file for complete search history.

(56) References Cited

U.S. PATENT DOCUMENTS

| | | | | |
|---|---|---|---|---|
| 5,551,751 A * | 9/1996 | Sedlack | ............... | B60N 2/2821 297/216.11 |
| 5,746,478 A * | 5/1998 | Lumley | ................ | B60N 2/2875 297/250.1 |
| 5,890,762 A * | 4/1999 | Yoshida | ............... | B60N 2/2821 297/130 |
| 7,073,859 B1 * | 7/2006 | Wilson | ................. | B60N 2/0232 297/250.1 |
| 7,735,921 B2 * | 6/2010 | Hutchinson | .......... | B60N 2/2806 297/256.13 |
| 8,899,678 B2 * | 12/2014 | Doolan | ................. | B60N 3/101 297/256.13 |
| 8,998,318 B2 * | 4/2015 | Gaudreau, Jr. | ...... | B60N 2/2821 297/256.13 |

* cited by examiner

*Primary Examiner* — Philip Gabler
(74) *Attorney, Agent, or Firm* — Winston Hsu

(57) ABSTRACT

A child restraint with recline includes a base, a seat slidably disposed thereon, and a locking mechanism. The locking mechanism is disposed in the base and the seat correspondingly and includes a pawl, two actuators, and a plurality of holes. The pawl is biased to protrude out to be selectively inserted into one of the plurality of holes. Each actuator includes a manipulation portion and a connecting portion kinematically connecting the manipulation portion and the pawl. The manipulation portions are exposed at the front side and rear sides of the child restraint respectively. The manipulation portion of each actuator is operable to independently drive the pawl through the connecting portion to disengage from the hole which the pawl is engaged with. The recline angle of the seat relative to the base can be adjusted by manipulating the manipulation portions from the front side or rear side of the child restraint.

8 Claims, 10 Drawing Sheets

CHILD RESTRAINT WITH RECLINE

CROSS REFERENCE TO RELATED APPLICATIONS

This application claims the benefit of U.S. Provisional Application No. 62/182,857 filed on Jun. 22, 2015 is incorporated herein by reference.

BACKGROUND OF THE INVENTION

1. Field of the Invention

The invention relates to a child restraint, and especially relates to a child restraint with recline.

2. Description of the Prior Art

Child restraints are used in motor vehicles to greatly improve the safety of a child in the event of an accident. Because seats in most vehicles are designed for an adult, the seat belts are not suited for the smaller size of most children. Therefore, the child restraint is secured into the vehicle and provides a greatly improved fit for the child. To improve the comfort of the child restraint and improve the installation into a variety of vehicle seats, many child restraints (CR) can be reclined. Some CRs, commonly called convertible car seats, are designed to be installed either forward or rearward in a vehicle. For most CRs, the recline actuator is on the front of the seat only. However, when a convertible car seat is installed facing rearward onto a vehicle seat, the recline actuator is hidden against the seatback of the vehicle seat. If needed, the user has to adjust the recline status of the CR before placing it onto the vehicle seat.

SUMMARY OF THE INVENTION

An objective of the invention is to provide a child restraint with recline. The seat of child restraint can be reclined by a selective engagement of a locking portion with one of a plurality of holes. The engagement is actuated by two manipulation portions which are oppositely exposed at opposite sides of the child restraint and connected to the locking portion. Thereby, a user can actuate the engagement at either side by the corresponding manipulation portion.

A child restraint with recline according to the invention has a front side and a rear side opposite to the front side and includes a base, a seat, and a locking mechanism. The seat is slidably disposed on the base along a curved surface and orientated toward the front side. The locking mechanism includes a pawl, a front actuator, a rear actuator, and a plurality of holes. The plurality of holes are disposed on the seat or the base; the pawl, the front actuator, and the rear actuator are disposed in the base or the seat correspondingly. The front actuator includes a front manipulation portion and a front connecting portion. The front connecting portion kinematically connects the front manipulation portion and the pawl. The rear actuator includes a rear manipulation portion and a rear connecting portion. The rear connecting portion kinematically connects the rear manipulation portion and the pawl. The front manipulation portion and the rear manipulation portion are disposed at the front side and the rear side respectively. The pawl is biased to protrude out and to be selectively inserted into one of the plurality of holes. The front manipulation portion and the rear manipulation portion are operable to independently drive the pawl through the front connecting portion and the rear connecting portion respectively to disengage from the engaged hole. Thereby, a user can operate either manipulation portion at corresponding side of the base to re-insert the pawl into another one of the plurality of holes for adjusting the position of the seat relative to the base.

Compared with the prior art, the child restraint with recline according to the invention is provided with the two manipulation portions exposed at the two opposite sides of the child respectively. Therefore, it is convenient for the user to adjust the recline position of the seat relative to the base no matter whether the child restraint with recline is installed forward or rearward onto a vehicle seat.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
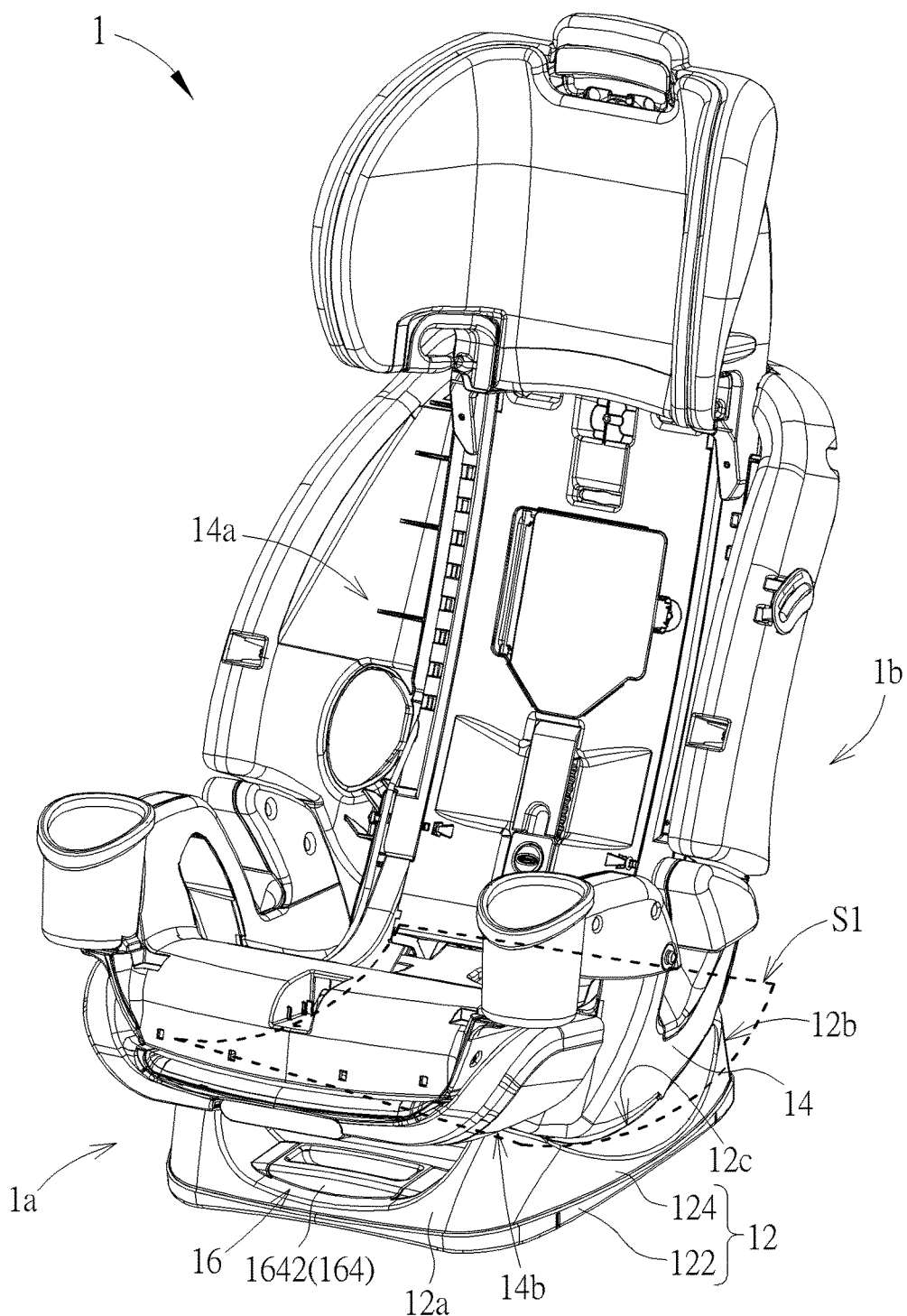
FIG. 1 is a schematic diagram illustrating a child restraint with recline of an embodiment according to the invention.
Figure 2:
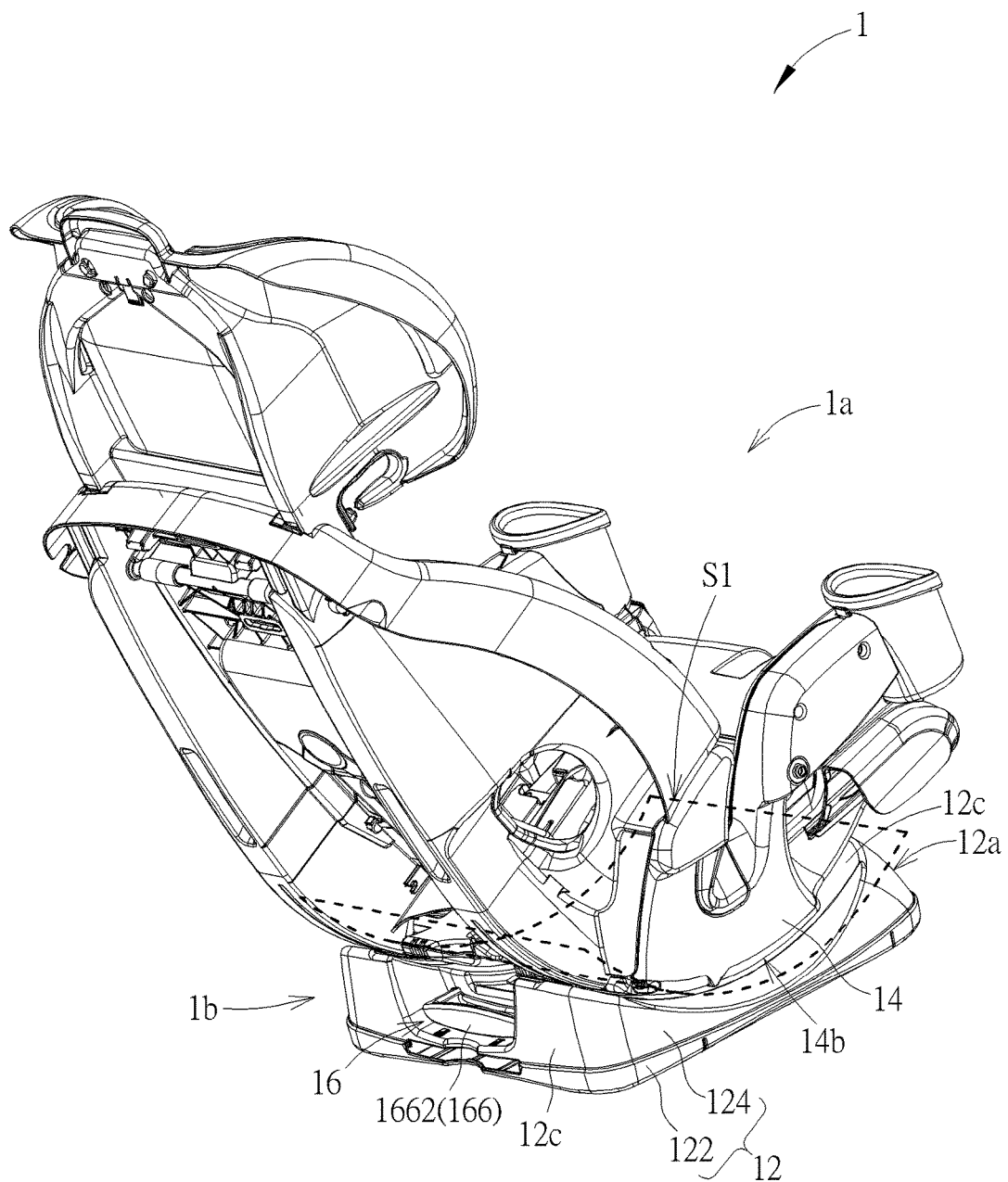
FIG. 2 is a schematic diagram illustrating the child restraint with recline in FIG. 1 from another view point.

Please refer to FIG. 1 and FIG. 2. A child restraint 1 with recline has a front side 1*a*, as shown by FIG. 1, and a rear side 1*b*, as shown by FIG. 2, opposite to the front side 1*a*. The child restraint 1 includes a base 12, a seat 14, and a locking mechanism 16. The base 12 has a front portion 12*a* and a rear portion 12*b* arranged in the same orientation as the front side 1*a* and the rear side 1*b*. The seat 14 has an accommodating space 14*a* for a child to sit therein. The seat 14 is slidably disposed on the base 12 along a curved surface S1 and orientated toward the front side 1*a*. The curved surface S1 is an imaginary surface and is indicated by dashed lines in FIG. 1 and FIG. 2. Thereby, a child sitting on the seat 14 will face toward the front side 1*a*. The recline angle of the seat 14 relative to the base 12 can be adjusted by sliding the seat 14 along the curved surface S1 relative to the base 12. The locking mechanism 16 is disposed on two opposite portions of the base 12 and the seat 14 respectively for positioning the relative position of the seat 14 to the base 12.

Figure 3:
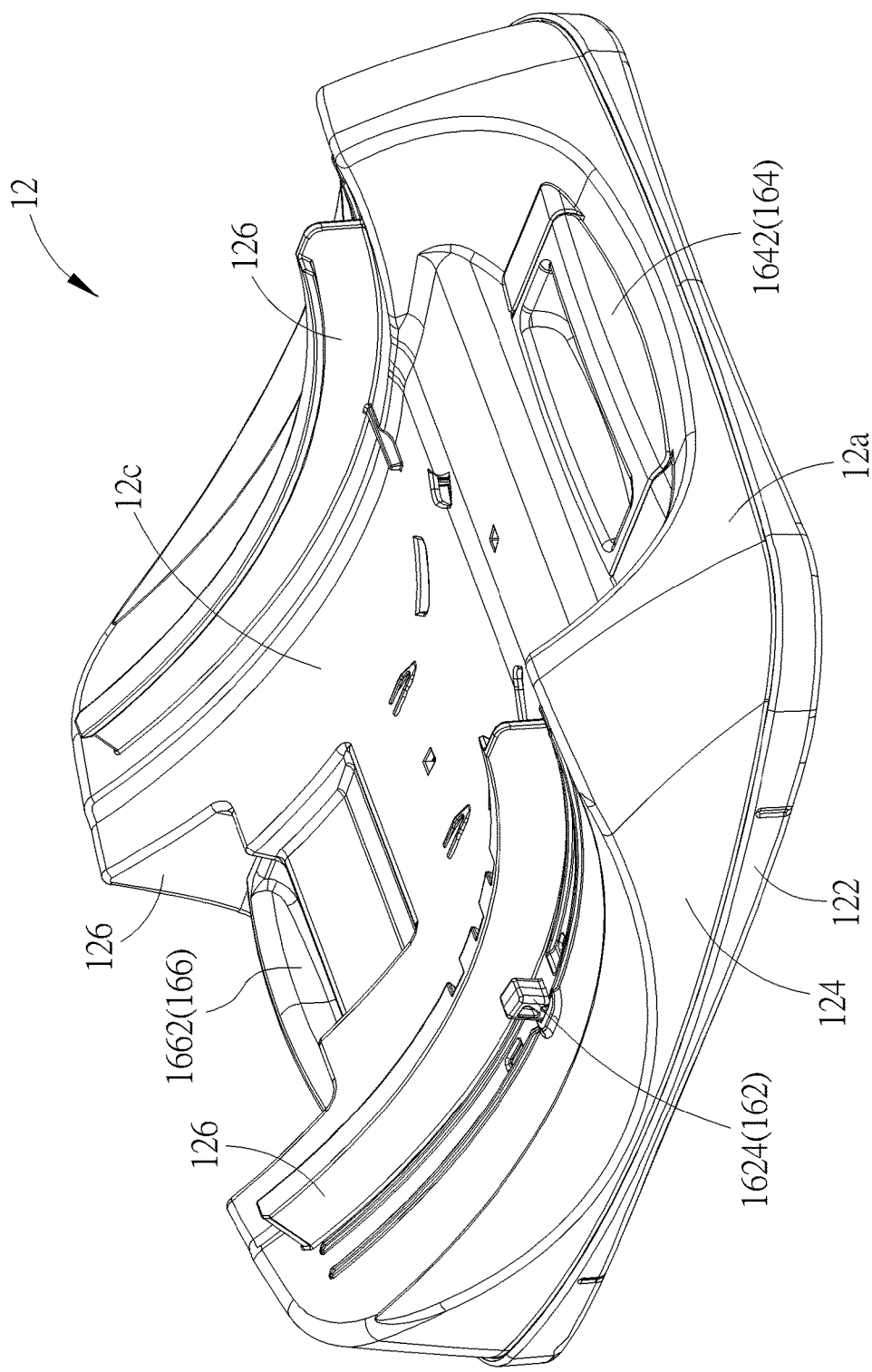
FIG. 3 is a schematic diagram illustrating a base of the child restraint with recline in FIG. 1.
Figure 4:
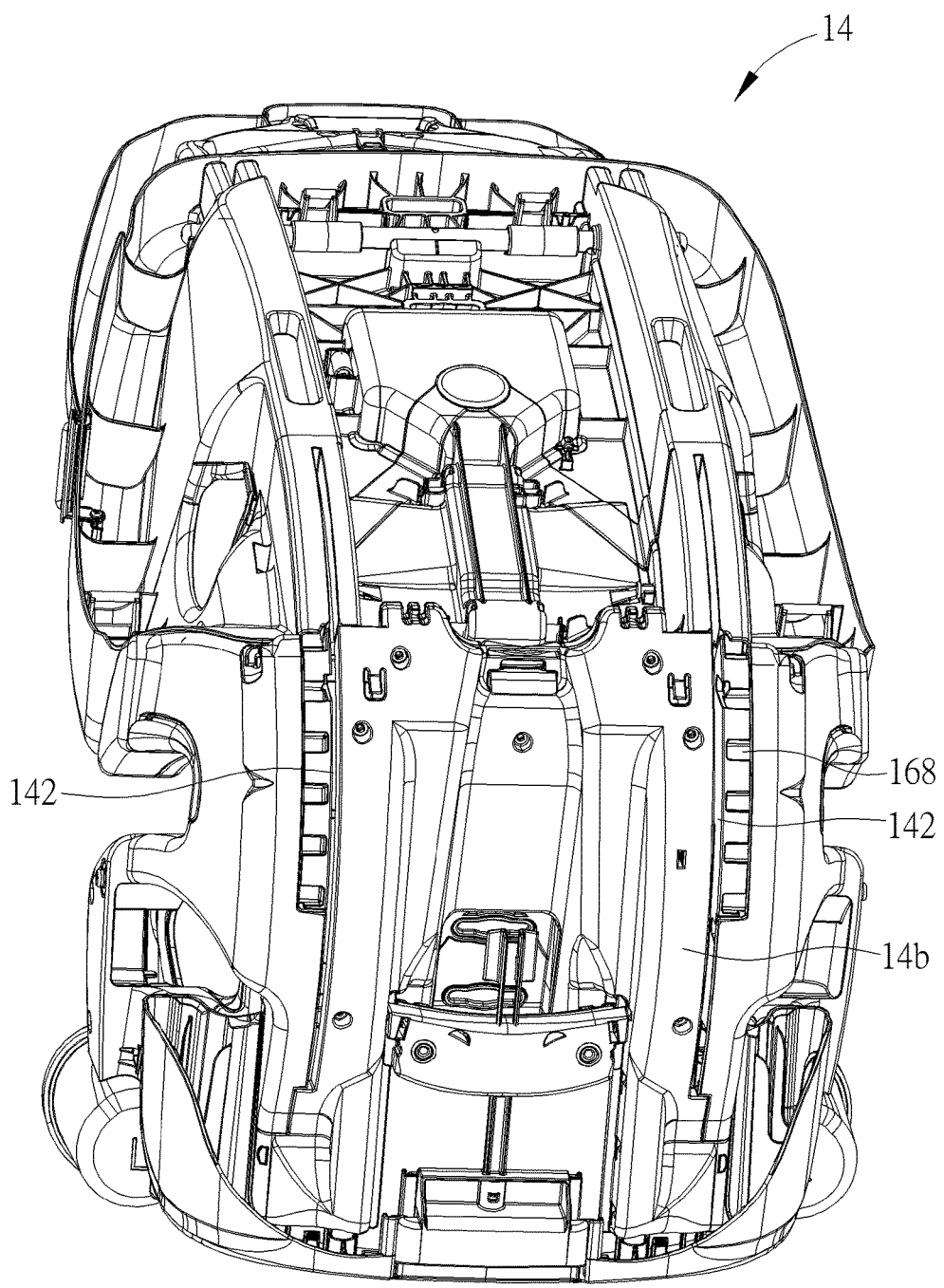
FIG. 4 is a schematic diagram illustrating a seat of the child restraint with recline in FIG. 1 from the bottom view.

Please also refer to FIG. 3 and FIG. 4. In the embodiment, the base 12 includes a lower casing 122 and an upper casing 124 engaged with the lower casing 122. The base 12 has two guiding rails 126 oppositely disposed on the top portion 12c of the base 12 (i.e. the top surface of the upper casing 124). The seat 14 has two sliding slots 142 oppositely disposed on the bottom portion 14b of the seat 14. The two sliding slots 142 slide on the two guiding rails 126 respectively, so that the seat 14 is slidably disposed on the base 12. The extension paths in which the guiding rails 126 and the sliding slots 142 extend are parallel to the curved surface S1 (or have the same curvature radius as the curved surface S1). In addition, in fact, the sliding slots 142 and the guiding rails 126 can be exchanged to be disposed on the base 12 and the seat 14 respectively. Furthermore, that the seat 14 is slidably disposed on the base 12 along the curved surface S1 can be achieved by other mechanism capable of allowing the seat 14 sliding on the base 12 along the curved surface S1, even just by two physical surfaces slidably contacting with each other, e.g. a top surface of the base 12 (or the upper casing 124) and a bottom surface of the seat 14 which are provided in curved surfaces.

Figure 5:
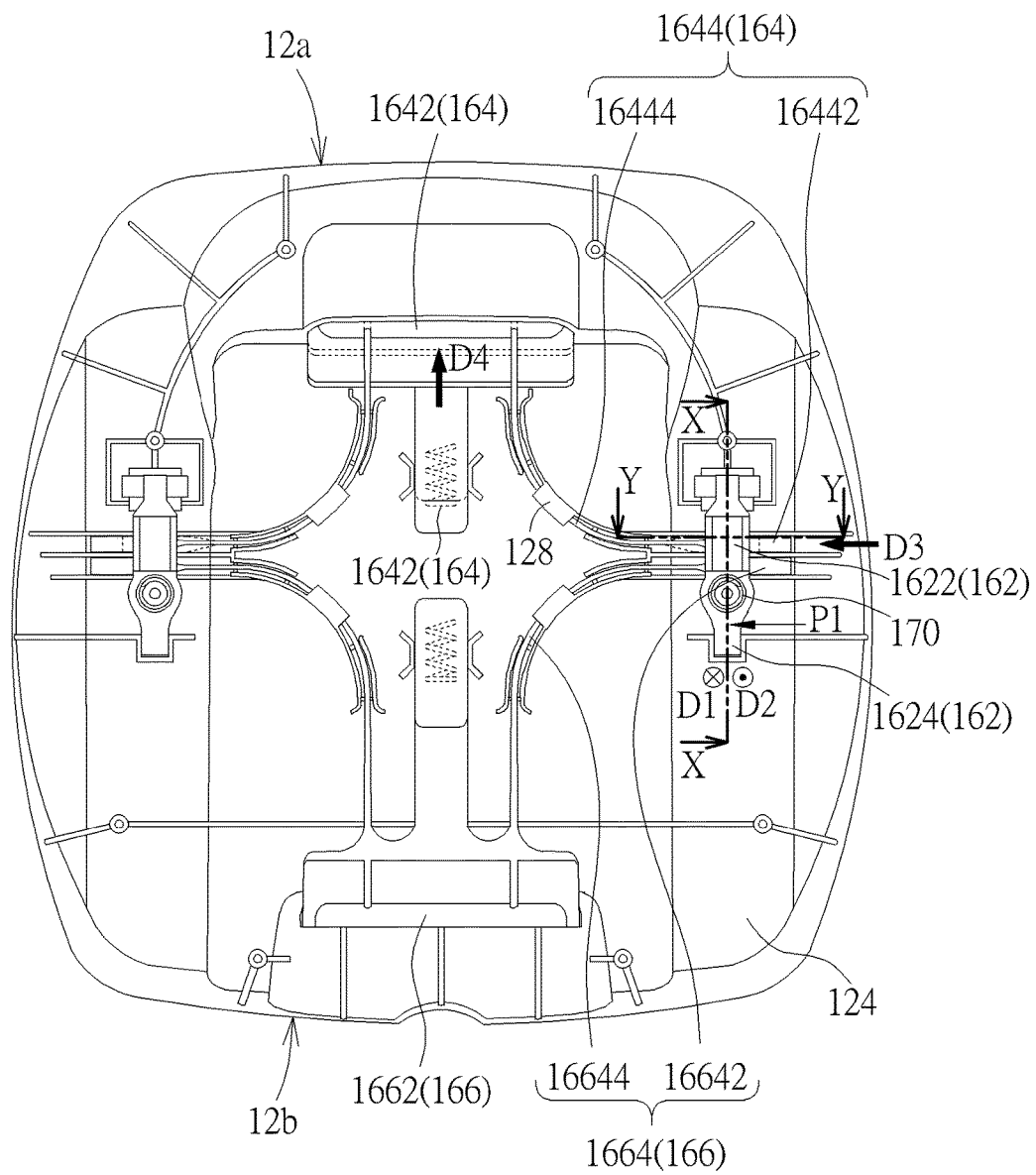
FIG. 5 is a schematic diagram illustrating the base without a lower casing thereof from the bottom view.
Figure 6:
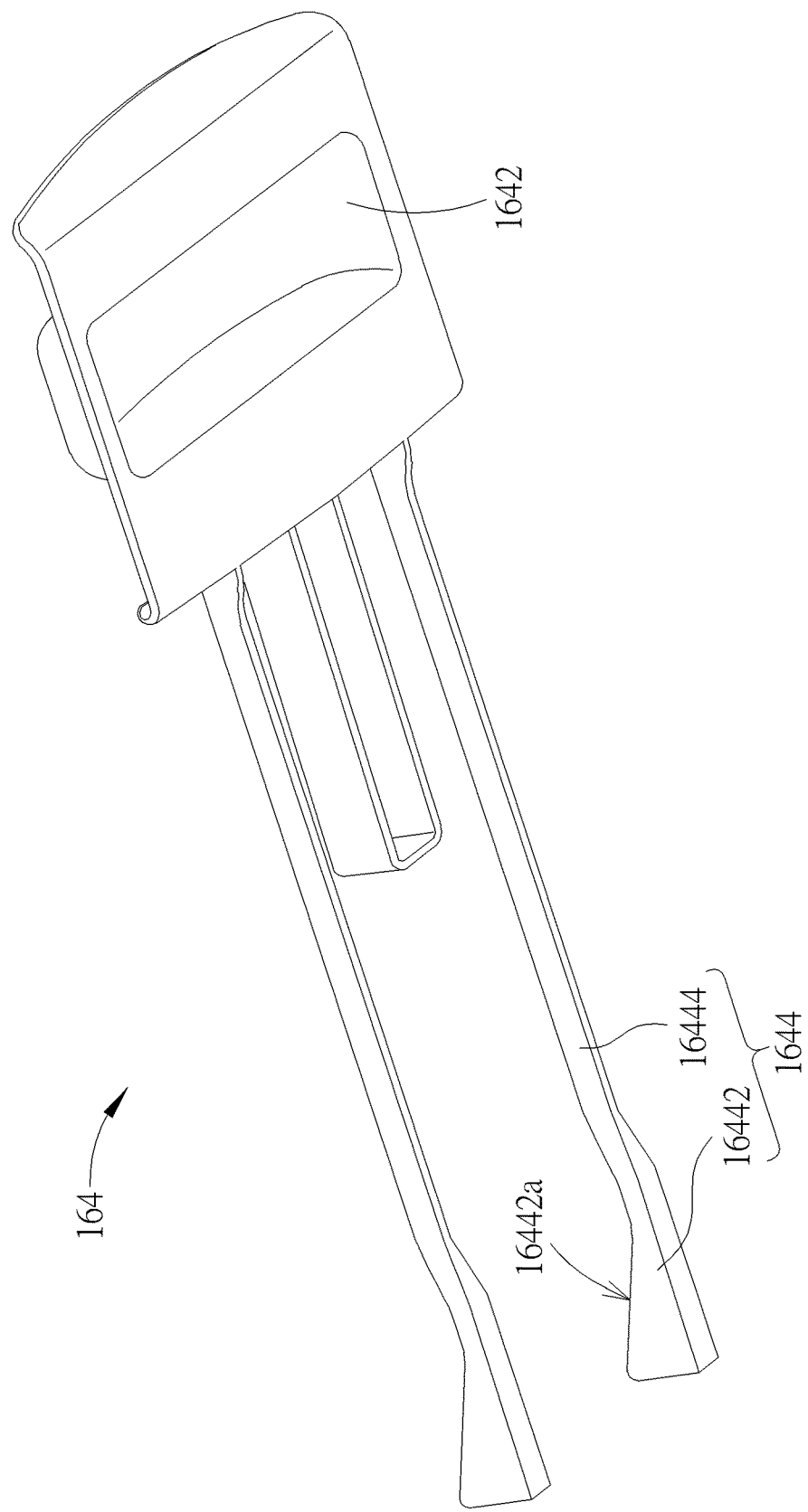
FIG. 6 is a schematic diagram illustrating an actuator of a locking mechanism of the child restraint with recline in FIG. 1.

Please also refer to FIG. 5 and FIG. 6. In the embodiment, the locking mechanism 16 includes a pawl 162, a front actuator 164, a rear actuator 166, and a plurality of holes 168. The pawl 162 is connected to the front actuator 164 and the rear actuator 166 individually. The pawl 162 is used to be selectively inserted into one of the plurality of holes 168. A user can operate the front actuator 164 or the rear actuator 166 to independently move the pawl 162. Thereby, the recline angle of the seat 14 relative to the base 12 is discretely adjusted by inserting the pawl 162 into different holes 168. In the embodiment, the plurality of holes 168 are disposed on the bottom portion 14b of the seat 14; correspondingly, the pawl 162, the front actuator 164, and the rear actuator 166 are disposed in the base 12. The plurality of holes 168 are integrated into the bottom portion 14b of the seat 14; e.g. the bottom portion 14b is formed in a plastic injection part. The front actuator 164 includes a front manipulation portion 1642 and a front connecting portion 1644. The front connecting portion 1644 kinematically connects the front manipulation portion 1642 and the pawl 162; thereby, the front connecting portion 1644 can transmits force and movement between the front manipulation portion 1642 and the pawl 162. The rear actuator 166 includes a rear manipulation portion 1662 and a rear connecting portion 1664. The rear connecting portion 1664 kinematically connects the rear manipulation portion 1662 and the pawl 162; thereby, the rear connecting portion 1664 can transmits force and movement between the rear manipulation portion 1662 and the pawl 162. The front manipulation portion 1642 and the rear manipulation portion 1662 are disposed at the front side 1a and the rear side 1b respectively; more exactly, the front manipulation portion 1642 and the rear manipulation portion 1662 are exposed at the front portion 12a and the rear portion 12b. The pawl 162 is biased to protrude out of the top portion 12c of the base 12 and to be selectively inserted into one of the plurality of holes 168. The front manipulation portion 1642 and the rear manipulation portion 1662 are operable to independently drive the pawl 162 through the front connecting portion 1644 and the rear connecting portion 1664 respectively to disengage from the engaged hole 168; then, the user, after reclining the seat 14 relative to the base 12, can release the front manipulation portion 1642 or the rear manipulation portion 1662 for rendering the pawl 162 be biased to be re-inserted into another one of the plurality of holes 168.

Furthermore, for simplification of the description about the locking mechanism 16, the front actuator 164 and the rear actuator 166 are provided with similar structures. The minor differences therebetween, e.g. size or dimension, are merely due to the disposition thereof on the base 12. They perform the same function and interaction with the pawl 162. Therefore, they are regarded as the same structure substantially in the description However, the invention is not limited thereto. In the following, for other descriptions about the rear actuator 166, please refer to the relevant descriptions of the front actuator 164. In the embodiment, the pawl 162 is pivotally connected to the base 12. The locking mechanism 16 includes a bias spring 170 biasing the pawl 162 to protrude out of the top portion 12c of the base 12. The bias spring 170 can be elastically deformed to produce biasing force to the pawl 162 so that the pawl 162 has a tendency to rotate upward to protrude out. But the invention is not limited thereto. For example, the pawl is a cantilever, one end of which is fixed in the base 12, the other end of which protrudes out of the top portion 12c of the base 12. Therein, the cantilever has the capability of elastically deforming and can produce biasing force by itself. Therefore, in this case, the pawl also functions a bias spring biasing the pawl to protrude out of the base 12.

Figure 7:
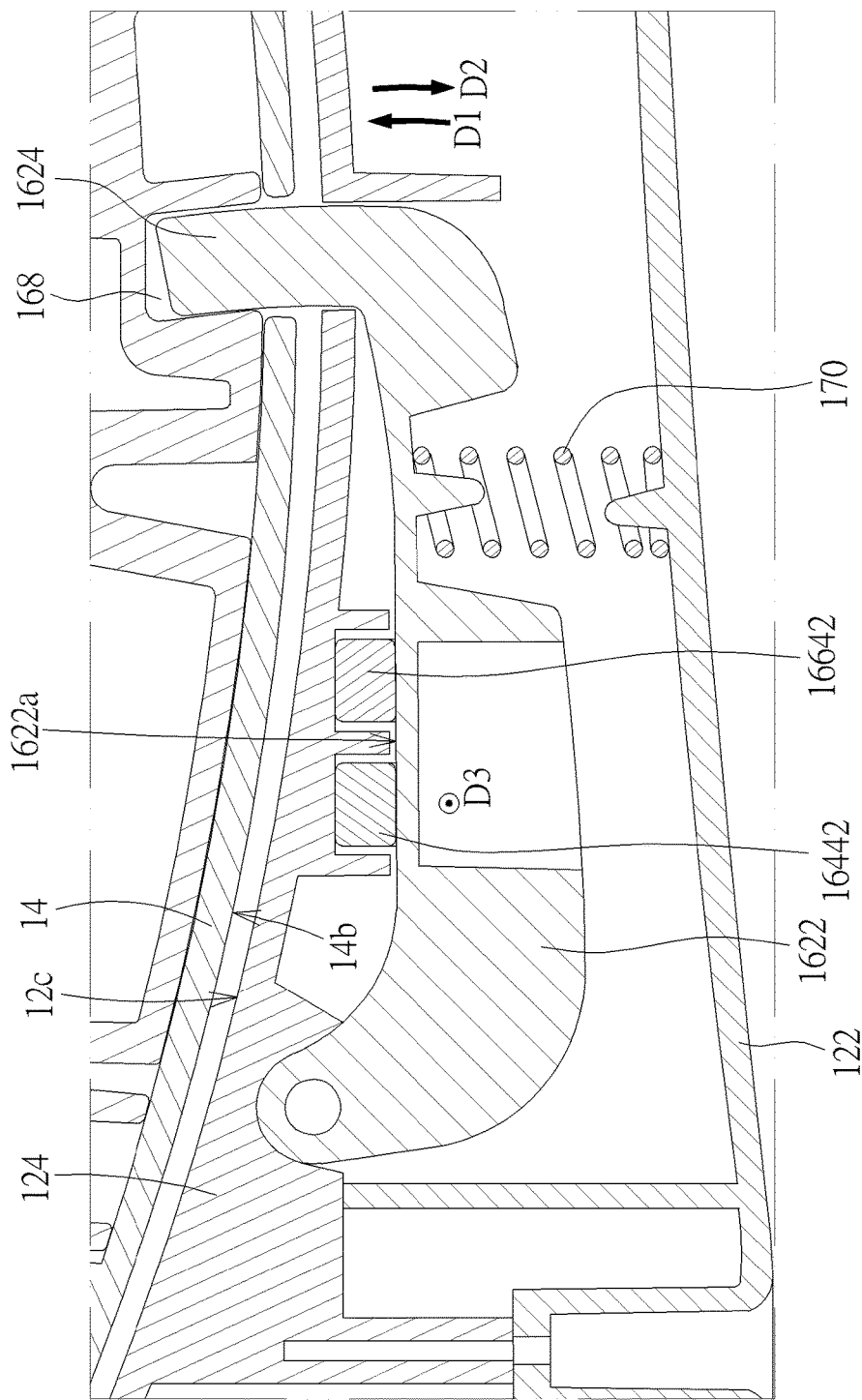
FIG. 7 is a sectional view of a portion of the child restraint with recline in FIG. 1 along the line X-X in FIG. 5 for illustrating the locking mechanism.
Figure 8:
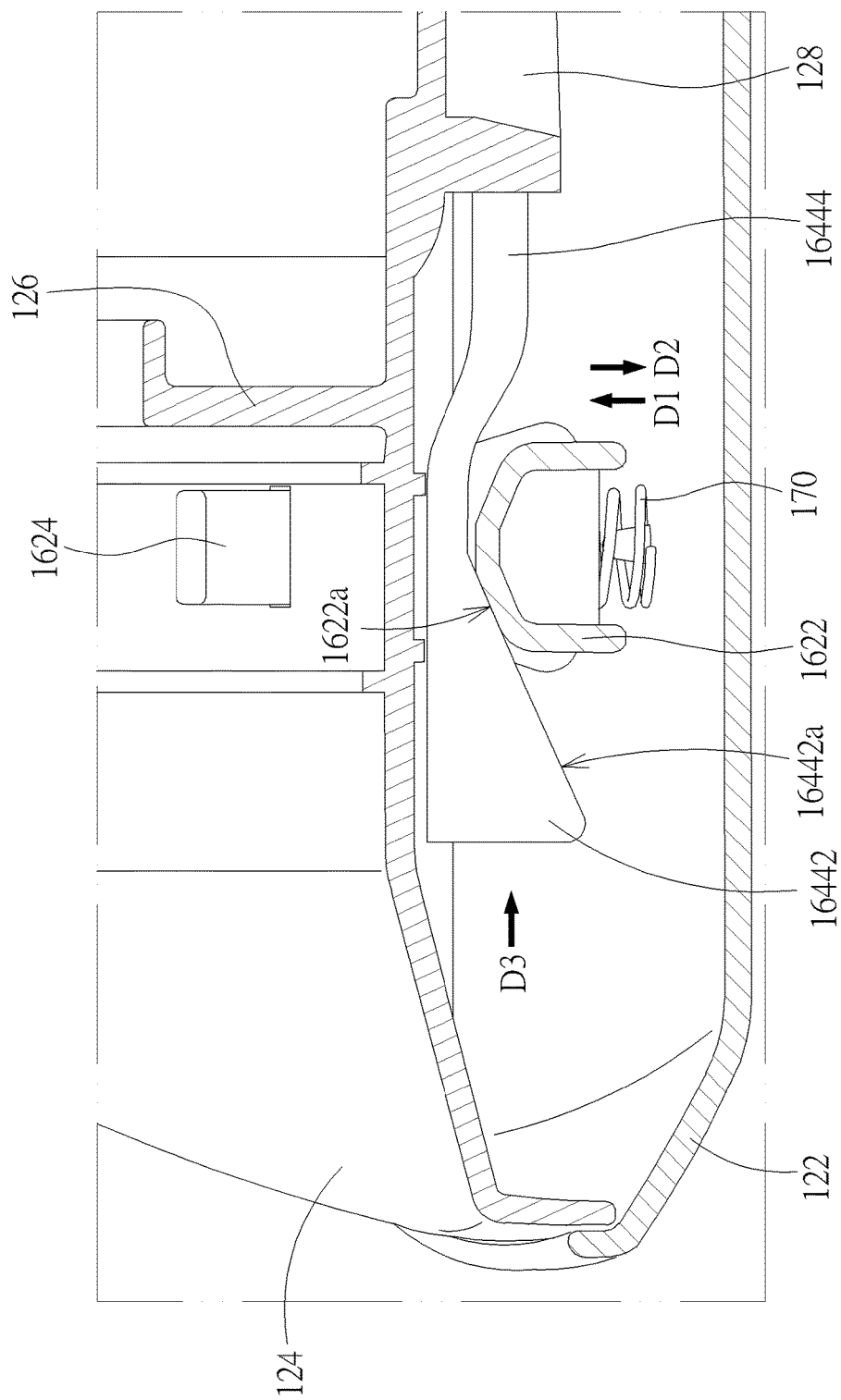
FIG. 8 is a sectional view of a portion of the child restraint with recline in FIG. 1 along the line Y-Y in FIG. 5 for illustrating the locking mechanism.
Figure 9:
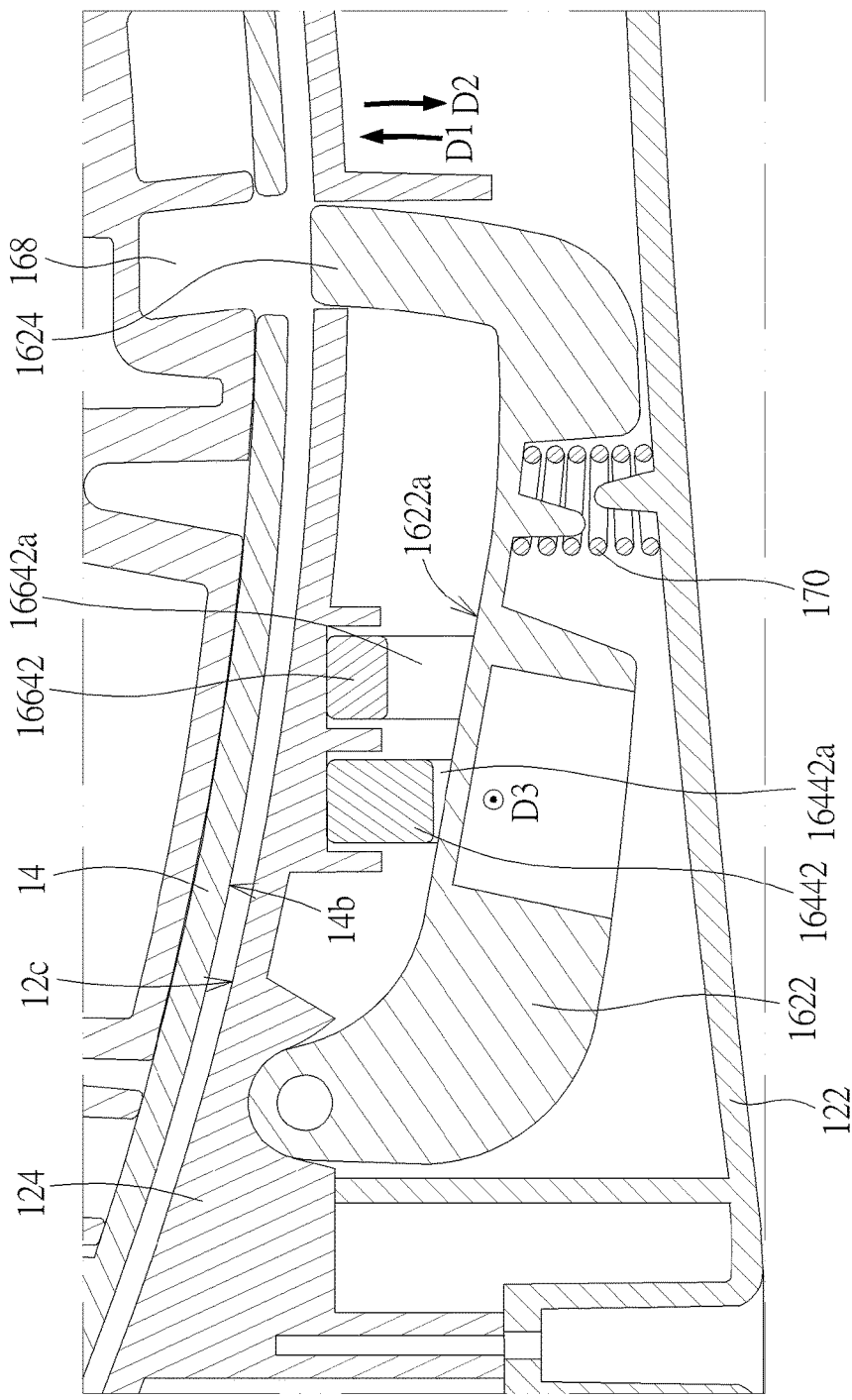
FIG. 9 is a sectional view of the locking mechanism in FIG. 7 with a pawl of the locking mechanism rotated downward.
Figure 10:
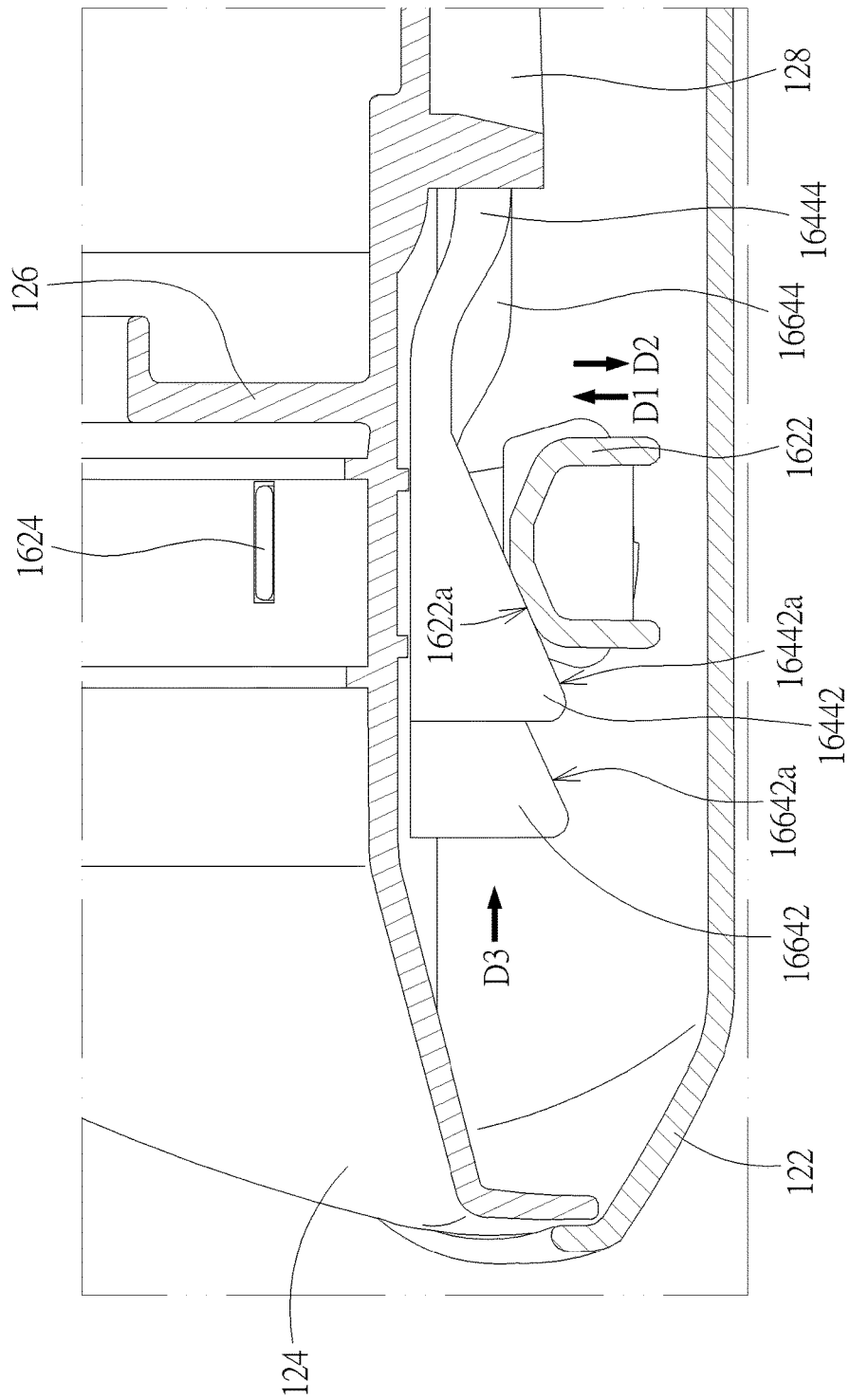
FIG. 10 is a sectional view of the locking mechanism in FIG. 8 with a pawl of the locking mechanism rotated downward.

Please also refer to FIG. 7 and FIG. 8. In the embodiment, the bias spring 170 is a coil spring compressed, disposed between the pawl 162 and the lower casing 122 of the base 12. Furthermore, the pawl 162 includes a pivotal portion 1622 and a locking portion 1624 connected to the pivotal portion 1622. The pivotal portion 1622 has a pivot 1622a and is pivotally connected to the upper casing 124 of the base 12 through the pivot 1622a. The bias spring 170 biases the pivotal portion 1622 to rotate in a rotation direction D1 (i.e. upwards) so that the locking portion 1624 protrudes out of the base 12 and is selectively inserted into one of the plurality of holes 168. The front connecting portion 1644 includes a front wedge 16442 and a front flexible member 16444. The front flexible member 16444 connects the front wedge 16442 and the front manipulation portion 1642. In the embodiment, the front actuator 164 is formed in one piece, e.g. by plastic injection, so the front flexible member 16444 is directly connected to the front wedge 16442 and the front manipulation portion 1642 respectively. The front wedge 16442 is disposed between the upper casing 124 and the pivotal portion 1622 and has a front ramped surface 16442a abutting against the pivotal portion 1622. The front manipulation portion 1642 is operable to draw the front wedge 16442 through the front flexible member 16444 so that the front wedge 16442 drives the pivotal portion 1622 through the front ramped surface 16442a to rotate in a reverse rotation direction D2 (i.e. downwards) opposite to the rotation direction D1 so that the locking portion 1624 is disengaged from the engaged hole 168, as shown by FIG. 9 and FIG. 10. In addition, the front connecting portion 1644 kinematically connects the front manipulation portion 1642 and the pawl 162 by directly joining with the front manipulation portion 1642 and slidably contacting with the pawl 162. However, the invention is not limited thereto. In principle, any mechanism capable of transmitting force and movement between two components is applicable, e.g. the above directly joining and slidably contacting, pin joining, gears engaging and so on.

Similarly, the rear wedge 16642 is disposed between the upper casing 124 and the pivotal portion 1622 and has a rear ramped surface 16642a abutting against the pivotal portion 1622. The rear manipulation portion 1662 is operable to draw the rear wedge 16642 through the rear flexible member 16644 so that the rear wedge 16642 drives the pivotal portion 1622 through the rear ramped surface 16642a to rotate in the reverse rotation direction D2 opposite to the rotation direction D1. Therein, the wedges 16442 and 16642 are movable independently, so either one of the wedges 16442 and 16642 can be drawn to rotate the pawl 162 downward for disengaging the locking portion 1624 from the engaged hole 168, referring to FIG. 9 and FIG. 10. Furthermore, as shown by FIG. 7 to FIG. 10, when the front wedge 16442 is drawn to push against the pivotal portion 1622 to rotate downward, the rear wedge 16642 remains unmoved. Therefore, the front wedge 16442 and the rear wedge 16642 can be individually drawn to push against the pivotal portion 1622 to rotate downward.

In addition, in the embodiment, the pivotal portion 1622 has a ramped surface 1622a abutting against the front ramped surface 16442a and the rear ramped surface 16642a, which improves the interaction between the pivotal portion 1622 and the wedges 16442 and 16642. In the embodiment, the front manipulation portion 1642 is operable to draw the front wedge 16442 through the front flexible member 16444 to move in a movement direction D3 perpendicular to a plane P1 (indicated by a chained line in FIG. 5) where the pivotal portion 1622 rotates; i.e. the movement direction D3 is perpendicular to the rotation direction D1. Furthermore, the user moves the front manipulation portion 1642 in a pulling direction D4 (as shown in FIG. 5) perpendicular to the movement direction D3. A guiding structure 128 is formed on the upper casing 124 and forms a passage in logic for the front flexible member 16444 to pass through, so the front flexible member 16444 transmits force and movement between the front manipulation portion 1642 and the front wedge 16442. Furthermore, the front actuator 164 includes a front restoring spring 1646 (shown in hidden lines in FIG. 5), connected to the front manipulation portion 1642 and the upper casing 124 of the base 12 for restoring the front manipulation portion 1642. Therein, the front restoring spring 1646 is a coil spring compressed, disposed between front manipulation portion 1642 and the upper casing 124 of the base 12.

When the user want to recline the seat 14 through the front manipulation portion 1642, the user pull the front manipulation portion 1642 in the pulling direction D4 so that the front manipulation portion 1642 moves from a first position (as shown in solid lines in FIG. 5) to a second position (as shown in dashed lines in FIG. 5). Therein, when the front manipulation portion 1642 is located at the first position, the locking portion 1624 is inserted into one of the plurality of holes 168 (also referring to FIG. 7 and FIG. 8). When the front manipulation portion 1642 is located at a second position, the locking portion 1624 disengages from the hole 168 which the locking portion 1624 is engaged with (also referring to FIG. 9 and FIG. 10), and the front restoring spring 1646 is elastically deformed to urges the front manipulation portion 1642 back to the first position (i.e. the front manipulation portion 1642 has a tendency to move back to the first position). When the user releases the front manipulation portion 1642 after reclining the seat 14 relative to the base 12, the front manipulation portion 1642 is moved back to the first position by the elastically deformed front restoring spring 1646, and the front wedge 16442 is pushed through the front flexible member 16444 to move in a direction opposite to the movement direction D3 and releases the pivotal portion 1622 so that the bias spring 170 pushes the pivotal portion 1622 to rotate in the rotation direction D1 so that the locking portion 1624 protrudes out of the upper casing 124 and inserts into one of the plurality of holes 168. Thereby, a recline adjustment on the seat 14 is performed. The above description is also applied to the rear wedge 16642.

In addition, in the above embodiment, the holes 168 are disposed on the seat 14, and the pawl 162, the front actuator 164, and the rear actuator 166 are disposed in the base 12 correspondingly. However, the invention is not limited thereto. For example, the holes 168 are formed on the base 12 and the others are disposed in the seat 14 correspondingly, which also can perform the positioning of the seat 14 relative to the base 12.

As described above, the child restraint 1 with recline according to the invention is provided with the two manipulation portions 1642 and 1662 at the two opposite sides 1a and 1b of the child restraint 1, so it is convenient for the user to adjust the recline position of the seat 14 relative to the base 12 no matter whether the child restraint 1 is installed facing forward or rearward onto a vehicle seat.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A child restraint with recline, having a front side and a rear side opposite to the front side and comprising:
   a base;
   a seat, slidably disposed on the base along a curved surface and orientated toward the front side; and
   a locking mechanism, comprising a pawl, a front actuator, a rear actuator, and a plurality of holes, the plurality of holes being disposed on one of the seat or the base, the pawl, the front actuator, and the rear actuator being disposed on the other of the seat or the base, the front actuator comprising a front manipulation portion and a front connecting portion, the front connecting portion kinematically connecting the front manipulation portion and the pawl, the rear actuator comprising a rear manipulation portion and a rear connecting portion, the rear connecting portion kinematically connecting the rear manipulation portion and the pawl, the front manipulation portion and the rear manipulation portion being disposed at the front side and the rear side respectively, the pawl being biased to protrude out and to be selectively inserted into one of the plurality of holes, the front manipulation portion and the rear manipulation portion being operable to independently drive the pawl through the front connecting portion and the rear connecting portion respectively to disengage from the hole which the pawl is engaged with.

2. The child restraint with recline of claim 1, wherein the pawl is pivotally connected to the base or the seat, and the locking mechanism comprises a bias spring biasing the pawl to protrude out.

3. The child restraint with recline of claim 2, wherein the plurality of holes are formed on a bottom portion of the seat, the pawl, the front actuator, and the rear actuator are disposed in the base, the pawl comprises a pivotal portion and a locking portion connected to the pivotal portion, the pivotal portion is pivotally connected to the base, and the bias spring biases the pivotal portion to rotate in a rotation direction so that the locking portion protrudes out of the base and is selectively inserted into one of the plurality of holes.

4. The child restraint with recline of claim 3, wherein the front connecting portion comprises a front wedge and a front flexible member, the front flexible member connects the front wedge and the front manipulation portion, the front wedge has a front ramped surface abutting against the pivotal portion, and the front manipulation portion is operable to draw the front wedge through the front flexible member so that the front wedge drives the pivotal portion through the front ramped surface to rotate in a reverse rotation direction opposite to the rotation direction.

5. The child restraint with recline of claim 4, wherein the rear connecting portion comprises a rear wedge and a rear flexible member, the rear flexible member connects the rear wedge and the rear manipulation, the rear wedge has a rear ramped surface abutting against the pivotal portion, and the rear manipulation portion is operable to draw the rear wedge through the rear flexible member so that the rear wedge drives the pivotal portion through the rear ramped surface to rotate in the reverse rotation direction.

6. The child restraint with recline of claim 4, wherein the pivotal portion has a ramped surface abutting against the front ramped surface of the front wedge.

7. The child restraint with recline of claim 4, wherein the front manipulation portion is operable to draw the front wedge through the front flexible member to move in a movement direction perpendicular to a plane where the pivotal portion rotates.

8. The child restraint with recline of claim 4, wherein the front actuator comprises a front restoring spring, connected to the front manipulation portion and the base, when the front manipulation portion is located at a first position, the locking portion is inserted into one of the plurality of holes, and when the front manipulation portion is located at a second position, the locking portion is disengaged from the hole which the locking portion is engaged with, and the front restoring spring is elastically deformed to urge the front manipulation portion back to the first position.

* * * * *